US012254470B2

(12) United States Patent
Zhang et al.

(10) Patent No.: US 12,254,470 B2
(45) Date of Patent: Mar. 18, 2025

(54) METHOD, SYSTEM, AND COMPUTER PROGRAM PRODUCT FOR PROCESSING A NON-FUNGIBLE TOKEN HAVING A DYNAMIC VALUE

(71) Applicant: Visa International Service Association, San Francisco, CA (US)

(72) Inventors: BingQuan Zhang, Singapore (SG); Gabriel Teo Yu Xiang, Singapore (SG)

(73) Assignee: Visa International Service Association, San Francisco, CA (US)

( * ) Notice: Subject to any disclaimer, the term of this patent is extended or adjusted under 35 U.S.C. 154(b) by 135 days.

(21) Appl. No.: 17/974,935

(22) Filed: Oct. 27, 2022

(65) Prior Publication Data
US 2024/0144262 A1 May 2, 2024

(51) Int. Cl.
*G06Q 20/38* (2012.01)
*G06Q 20/32* (2012.01)
*G06Q 30/02* (2023.01)

(52) U.S. Cl.
CPC ....... *G06Q 20/389* (2013.01); *G06Q 20/3276* (2013.01); *G06Q 30/0278* (2013.01)

(58) Field of Classification Search
CPC .................. G06Q 30/0235; G06Q 30/0212
See application file for complete search history.

(56) References Cited

U.S. PATENT DOCUMENTS

| 2015/0100398 | A1* | 4/2015 | Narayanaswami .......................... G06Q 30/0236 705/14.1 |
| 2015/0112790 | A1* | 4/2015 | Wolinsky ........... G06Q 30/0238 705/14.38 |
| 2020/0005284 | A1 | 1/2020 | Vijayan |
| 2021/0279695 | A1* | 9/2021 | Rice ....................... G06Q 20/12 |
| 2022/0253902 | A1* | 8/2022 | Fowler ................ G06F 16/9554 |

FOREIGN PATENT DOCUMENTS

WO 2020150865 A1 7/2020

OTHER PUBLICATIONS

Stripto: The World's 1st NFT Marketplace With Dynamic Pricing Protocol is Set to Be Launched on the BSC With Its Exclusive Features.
(Continued)

*Primary Examiner* — David P Sharvin
(74) *Attorney, Agent, or Firm* — The Webb Law Firm

(57) ABSTRACT

A method includes generating a media object; associating the media object with a trigger action; monitoring user activity of a user to detect an occurrence of the trigger action by the user; in response to detection of the occurrence of the trigger action by the user, modifying the media object to generate a modified media object; minting the modified media object as a non-fungible token (NFT) on a blockchain network; associating a dynamic value with the NFT, the dynamic value configured to change as a function of at least time according to an algorithm; providing the NFT to the user; in response to the user initiating redemption of the NFT in connection with an electronic payment transaction having a transaction amount, determining the dynamic value of the NFT based on the algorithm; and processing the electronic payment transaction by applying the dynamic value to the transaction amount.

19 Claims, 8 Drawing Sheets

(56) References Cited

OTHER PUBLICATIONS

Zheng et al., "URSA: Precise Capacity Planning and Contention-aware Scheduling for Public Clouds" (2019) arXiv:1912.11963v1.
Zhou, "The Next Wave of NFTs Will be Dynamic", Nasdaq (2021) https://www.nasdaq.com/articles/the-next-wave-of-nfts-will-be-dynamic-2021-03-29.

* cited by examiner

METHOD, SYSTEM, AND COMPUTER PROGRAM PRODUCT FOR PROCESSING A NON-FUNGIBLE TOKEN HAVING A DYNAMIC VALUE

BACKGROUND

1. Field

This disclosure relates generally to non-fungible tokens (NFTs) and, in some non-limiting embodiments or aspects, to methods, systems, and computer program products for processing NFTs having a dynamic value.

2. Technical Considerations

Online engagement is a challenge faced by merchants and other entities that seek to interact with users through a network environment. Existing incentive and loyalty programs seek to encourage customer loyalty and participation, which can become increasingly difficult with a rising number of distractions when a user interacts with their device and/or an application (such as a mobile application or webpage). Moreover, users engage in incentive and loyalty programs on an individual level without any transparency over the operation and management of the same.

NFTs are assets that are maintained on and transferred within a blockchain network. Individuals may be interested in NFTs without having the know-how to engage with existing NFT tools and ecosystems.

SUMMARY

According to some non-limiting embodiments or aspects, a method includes: generating, with at least one processor, a media object; associating, with at least one processor, the media object with a trigger action; monitoring, with at least one processor, user activity of a user to detect an occurrence of the trigger action by the user; in response to detection of the occurrence of the trigger action by the user, modifying, with the at least one processor, the media object to generate a modified media object; minting, with at least one processor, the modified media object as a non-fungible token (NFT) on a blockchain network; associating, with at least one processor, a dynamic value with the NFT, the dynamic value configured to change as a function of at least time according to an algorithm; providing, with at least one processor, the NFT to the user; in response to the user initiating redemption of the NFT in connection with an electronic payment transaction having a transaction amount, determining, with at least one processor, the dynamic value of the NFT based on the algorithm; and processing, with at least one processor, the electronic payment transaction by applying the dynamic value to the transaction amount.

In non-limiting embodiments or aspects, initiating redemption of the NFT may include scanning a machine readable code corresponding to the NFT, where the method includes identifying, with at least one processor, the NFT based on the machine readable code. The machine readable code may be scanned during processing of the electronic payment transaction. The machine readable code may include a QR code. The method may include: in response to detection of the occurrence of the trigger action by the user, collecting, with at least one processor, trigger action data corresponding to details associated with the occurrence of the trigger action, where the media object is modified based on the trigger action data. A design of the media object may be modified based on the trigger action data. The trigger action may include at least one purchase activity executed by the user. The dynamic value associated with the NFT may decrease over time. The method may include, in response to applying the dynamic value to the transaction amount, retrieving, with at least one processor, the NFT from the user. The method may include, in response to applying the dynamic value to the transaction amount, deactivating, with at least one processor, the NFT from being used as a coupon in a future electronic payment transaction.

According to some non-limiting embodiments or aspects, a system may include at least one processor programmed and/or configured to: generate a media object; associate the media object with a trigger action; monitor user activity of a user to detect an occurrence of the trigger action by the user; in response to detection of the occurrence of the trigger action by the user, modify the media object to generate a modified media object; mint the modified media object as a non-fungible token (NFT) on a blockchain network; associate a dynamic value with the NFT, the dynamic value configured to change as a function of at least time according to an algorithm; provide the NFT to the user; in response to the user initiating redemption of the NFT in connection with an electronic payment transaction having a transaction amount, determine the dynamic value of the NFT based on the algorithm; and process the electronic payment transaction by applying the dynamic value to the transaction amount.

In non-limiting embodiments or aspects, initiating redemption of the NFT may include scanning a machine readable code corresponding to the NFT, where the at least one processor may be programmed and/or configured to identify the NFT based on the machine readable code. The machine readable code may be scanned during processing of the electronic payment transaction. The machine readable code may include a QR code. The at least one processor may be programmed and/or configured to: in response to detection of the occurrence of the trigger action by the user, collect trigger action data corresponding to details associated with the occurrence of the trigger action, where the media object may be modified based on the trigger action data. A design of the media object may be modified based on the trigger action data. The trigger action may include at least one purchase activity executed by the user. The dynamic value associated with the NFT may decrease over time. In response to applying the dynamic value to the transaction amount, the at least one processor may be programmed and/or configured to retrieve the NFT from the user. In response to applying the dynamic value to the transaction amount, the at least one processor may be programmed and/or configured to deactivate the NFT from being used as a coupon in a future electronic payment transaction.

According to some non-limiting embodiments or aspects, a computer program product includes at least one non-transitory computer-readable medium including program instructions that, when executed by at least one processor, cause the at least one processor to: generate a media object; associate the media object with a trigger action; monitor user activity of a user to detect an occurrence of the trigger action by the user; in response to detection of the occurrence of the trigger action by the user, modify the media object to generate a modified media object; mint the modified media object as a non-fungible token (NFT) on a blockchain network; associate a dynamic value with the NFT, the dynamic value configured to change as a function of at least time according to an algorithm; provide the NFT to the user;

in response to the user initiating redemption of the NFT in connection with an electronic payment transaction having a transaction amount, determine the dynamic value of the NFT based on the algorithm; and process the electronic payment transaction by applying the dynamic value to the transaction amount.

In non-limiting embodiments or aspects, initiating redemption of the NFT may include scanning a machine readable code corresponding to the NFT, where the program instructions may cause the at least one processor to identify the NFT based on the machine readable code. The machine readable code may be scanned during processing of the electronic payment transaction. The machine readable code may include a QR code. The program instructions may cause the at least one processor to: in response to detection of the occurrence of the trigger action by the user, collect trigger action data corresponding to details associated with the occurrence of the trigger action, where the media object may be modified based on the trigger action data. A design of the media object may be modified based on the trigger action data. The trigger action may include at least one purchase activity executed by the user. The dynamic value associated with the NFT may decrease over time. In response to applying the dynamic value to the transaction amount, the program instructions may cause the at least one processor to retrieve the NFT from the user. In response to applying the dynamic value to the transaction amount, the program instructions may cause the at least one processor to deactivate the NFT from being used as a coupon in a future electronic payment transaction.

Further non-limiting embodiments or aspects are set forth in the following numbered clauses:

Clause 1: A method comprising: generating, with at least one processor, a media object; associating, with at least one processor, the media object with a trigger action; monitoring, with at least one processor, user activity of a user to detect an occurrence of the trigger action by the user; in response to detection of the occurrence of the trigger action by the user, modifying, with the at least one processor, the media object to generate a modified media object; minting, with at least one processor, the modified media object as a non-fungible token (NFT) on a blockchain network; associating, with at least one processor, a dynamic value with the NFT, the dynamic value configured to change as a function of at least time according to an algorithm; providing, with at least one processor, the NFT to the user; in response to the user initiating redemption of the NFT in connection with an electronic payment transaction having a transaction amount, determining, with at least one processor, the dynamic value of the NFT based on the algorithm; and processing, with at least one processor, the electronic payment transaction by applying the dynamic value to the transaction amount.

Clause 2: The method of clause 1, wherein initiating redemption of the NFT comprises scanning a machine readable code corresponding to the NFT, wherein the method comprises identifying, with at least one processor, the NFT based on the machine readable code.

Clause 3: The method of clause 2, wherein the machine readable code is scanned during processing of the electronic payment transaction.

Clause 4: The method of clause 2 or 3, wherein the machine readable code comprises a QR code.

Clause 5: The method of any of clauses 1-4, further comprising: in response to detection of the occurrence of the trigger action by the user, collecting, with at least one processor, trigger action data corresponding to details associated with the occurrence of the trigger action, wherein the media object is modified based on the trigger action data.

Clause 6: The method of clause 5, wherein a design of the media object is modified based on the trigger action data.

Clause 7: The method of any of clauses 1-6, wherein the trigger action comprises at least one purchase activity executed by the user.

Clause 8: The method of any of clauses 1-7, wherein the dynamic value associated with the NFT decreases over time.

Clause 9: The method of any of clauses 1-8, wherein in response to applying the dynamic value to the transaction amount, retrieving, with at least one processor, the NFT from the user.

Clause 10: The method of any of clauses 1-9, wherein in response to applying the dynamic value to the transaction amount, deactivating, with at least one processor, the NFT from being used as a coupon in a future electronic payment transaction.

Clause 11: A system comprising at least one processor programmed and/or configured to: generate a media object; associate the media object with a trigger action; monitor user activity of a user to detect an occurrence of the trigger action by the user; in response to detection of the occurrence of the trigger action by the user, modify the media object to generate a modified media object; mint the modified media object as a non-fungible token (NFT) on a blockchain network; associate a dynamic value with the NFT, the dynamic value configured to change as a function of at least time according to an algorithm; provide the NFT to the user; in response to the user initiating redemption of the NFT in connection with an electronic payment transaction having a transaction amount, determine the dynamic value of the NFT based on the algorithm; and process the electronic payment transaction by applying the dynamic value to the transaction amount.

Clause 12: The system of clause 11, wherein initiating redemption of the NFT comprises scanning a machine readable code corresponding to the NFT, wherein the at least one processor is programmed and/or configured to identify the NFT based on the machine readable code.

Clause 13: The system of clause 12, wherein the machine readable code is scanned during processing of the electronic payment transaction.

Clause 14: The system of clause 12 or 13, wherein the machine readable code comprises a QR code.

Clause 15: The system of any of clauses 11-14, wherein the at least one processor is programmed and/or configured to: in response to detection of the occurrence of the trigger action by the user, collect trigger action data corresponding to details associated with the occurrence of the trigger action, wherein the media object is modified based on the trigger action data.

Clause 16: The system of clause 15, wherein a design of the media object is modified based on the trigger action data.

Clause 17: The system of any of clauses 11-16, wherein the trigger action comprises at least one purchase activity executed by the user.

Clause 18: The system of any of clauses 11-17, wherein the dynamic value associated with the NFT decreases over time.

Clause 19: The system of any of clauses 11-18, wherein in response to applying the dynamic value to the transaction amount, the at least one processor is programmed and/or configured to retrieve the NFT from the user.

Clause 20: The system of any of clauses 11-19, wherein in response to applying the dynamic value to the transaction amount, the at least one processor is programmed and/or configured to deactivate the NFT from being used as a coupon in a future electronic payment transaction.

Clause 21: A computer program product comprising at least one non-transitory computer-readable medium including program instructions that, when executed by at least one processor, cause the at least one processor to: generate a media object; associate the media object with a trigger action; monitor user activity of a user to detect an occurrence of the trigger action by the user; in response to detection of the occurrence of the trigger action by the user, modify the media object to generate a modified media object; mint the modified media object as a non-fungible token (NFT) on a blockchain network; associate a dynamic value with the NFT, the dynamic value configured to change as a function of at least time according to an algorithm; provide the NFT to the user; in response to the user initiating redemption of the NFT in connection with an electronic payment transaction having a transaction amount, determine the dynamic value of the NFT based on the algorithm; and process the electronic payment transaction by applying the dynamic value to the transaction amount.

Clause 22: The computer program product of clause 21, wherein initiating redemption of the NFT comprises scanning a machine readable code corresponding to the NFT, wherein the program instructions cause the at least one processor to identify the NFT based on the machine readable code.

Clause 23: The computer program product of clause 22, wherein the machine readable code is scanned during processing of the electronic payment transaction.

Clause 24: The computer program product of clause 22 or 23, wherein the machine readable code comprises a QR code.

Clause 25: The computer program product of any of clauses 21-24, wherein the program instructions cause the at least one processor to: in response to detection of the occurrence of the trigger action by the user, collect trigger action data corresponding to details associated with the occurrence of the trigger action, wherein the media object is modified based on the trigger action data.

Clause 26: The computer program product of clause 25, wherein a design of the media object is modified based on the trigger action data.

Clause 27: The computer program product of any of clauses 21-26, wherein the trigger action comprises at least one purchase activity executed by the user.

Clause 28: The computer program product of any of clauses 21-27, wherein the dynamic value associated with the NFT decreases over time.

Clause 29: The computer program product of any of clauses 21-28, wherein in response to applying the dynamic value to the transaction amount, the program instructions cause the at least one processor to retrieve the NFT from the user.

Clause 30: The computer program product of any of clauses 21-29, wherein in response to applying the dynamic value to the transaction amount, the program instructions cause the at least one processor to deactivate the NFT from being used as a coupon in a future electronic payment transaction.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
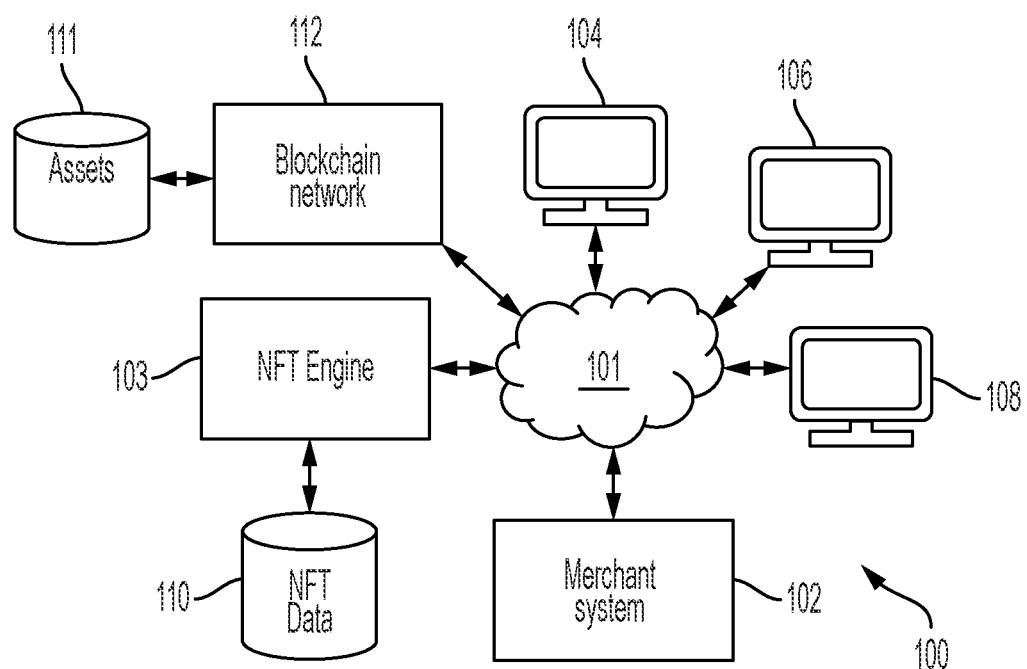
FIG. 1 shows a schematic diagram of a system for processing an NFT having a dynamic value, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "account data," refers to any data concerning one or more accounts for one or more users. Account data may include, for example, one or more account identifiers, user identifiers, transaction histories, balances, credit limits, issuer institution identifiers, and/or the like.

As used herein, the term "account identifier" may refer to one or more types of identifiers associated with an account (e.g., a primary account number (PAN) associated with an account, a card number associated with an account, a payment card number associated with an account, a token associated with an account, and/or the like). In some non-limiting embodiments, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the terms "communication" and "communicate" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments, a message may refer to a network packet (e.g., a data packet and/or the like) that includes data.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "issuer," "issuer institution," "issuer bank," or "payment device issuer" may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein, "issuer system" may refer to one or more computer systems operated by or on behalf of an issuer, such as a server executing one or more software applications. For example, an issuer system may include one or more authorization servers for authorizing a transaction.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, "merchant system" may refer to one or more computer systems operated by or on behalf of a merchant, such as a server executing one or more software applications. As used herein, the term "product" may refer to one or more goods and/or services offered by a merchant.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, a radio frequency identification (RFID) transponder, a retailer discount or loyalty card, and/or the like. The payment device may include a volatile or a non-volatile memory to store information (e.g., an account identifier, a name of the account holder, and/or the like).

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, RFID receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

The term "processor," as used herein, may represent any type of processing unit, such as a single processor having one or more cores, one or more cores of one or more processors, multiple processors each having one or more cores, and/or other arrangements and combinations of processing units. Reference to "at least one processor" can refer to a previously-recited processor or a different processor.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices such as, but not limited to, processors, servers, client devices, software applications, and/or other like components.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, "transaction processing system" may refer to one or more computer systems operated by or on behalf of a transaction service provider, such as a transaction processing server executing one or more software applications. A transaction processing system may include one or more processors and, in some non-limiting embodiments, may be operated by or on behalf of a transaction service provider.

Provided are systems, methods, and computer program products for processing NFTs having a dynamic value that enable dynamic offers to be integrated with electronic payment transactions in a blockchain network. Non-limiting embodiments described herein provide for an improved merchant and/or issuer loyalty system in which digital assets are used to prevent fraud, provide transparency, and encourage participation through gamification. Non-limiting embodiments provide for a dynamic rewards structure that varies over time based on user engagement. In non-limiting embodiments, an NFT provided to the user may have a dynamic value associated therewith, which is configured to change as a function of at least time according to an algorithm. The discretely and/or continually (e.g., periodically, at regular or irregular intervals, and/or the like) changing dynamic value of the NFT may be determined in response to initiation of the redemption of the NFT in connection with an electronic payment transaction, such that the dynamic value may be applied to the payment transaction. The use of the blockchain network may prevent fraud by ensuring that the dynamic value of the NFT is used according to the rules of the reward campaign and may provide transparency (e.g., based on the open nature of the blockchain) by enabling a user to confirm, based on the algorithm, the correct dynamic value of the NFT was determined and applied.

Referring to FIG. 1, illustrated is a diagram of a system 100 for processing an NFT having a dynamic value according to some non-limiting embodiments or aspects. As illustrated in FIG. 1, the system 100 includes an NFT engine 103 in communication with NFT data 110. The NFT engine 103 may include software executing on one or more computing devices. The NFT data 110 may be stored on a data storage device in communication with the NFT engine 103. The system 100 also includes a merchant system 102 and user computing devices 104, 106, 108 (hereinafter "user devices"). It will be appreciated that any number of merchant systems and/or user computing devices may be included in the system 100. The NFT engine 103, merchant system 102, and user devices 104, 106, 108 may communicate via a public or private network 101, such as the Internet. In non-limiting embodiments, the network 101 may be a payment network including and/or in communication with one or more issuer systems, acquirer systems, transaction processing systems, payment gateways, and/or other systems involved in processing a payment transaction. The NFT engine 103, merchant system 102, and user devices 104, 106, 108 may be in communication with a blockchain network 112. In some non-limiting embodiments, one or more of the NFT engine 103, merchant system 102, and user devices 104, 106, 108 may operate as nodes in the blockchain network 112 such that they host a distributed ledger associated with the blockchain network 112 and/or perform other actions in connection with the blockchain network 112.

The blockchain network 112 may include any public or private blockchain. For example, non-limiting embodiments may be implemented on the Ethereum blockchain, the Solana blockchain, the Flow blockchain, a public or private blockchain specially purposed for the system 100, and/or any other blockchain network.

With continued reference to FIG. 1, in non-limiting embodiments the NFT engine 103 may be part of and/or operated by an issuer system, payment gateway, and/or transaction processing system (not shown in FIG. 1). In other non-limiting embodiments, the NFT engine 103 may be part of and/or operated by the merchant system 102. It will be appreciated that the functionality of the NFT engine 103 described herein may also be performed by multiple different computing devices and/or software functions. For example, in some non-limiting embodiments a transaction processing system and/or issuer system may operate the NFT engine 103 such that it is usable by merchants (e.g., merchant system 102) to customize NFT campaigns by uploading digital media (e.g., images, video clips, audio clips, and/or the like) to use for the NFTs and parameters, such as one or more values, rewards, rules, and/or the like. In some non-limiting embodiments, a transaction processing system and/or issuer system may operate the NFT engine 103 such that it is usable by the issuer to customize NFT campaigns to reward account holders for making purchases using one or more accounts. In some non-limiting embodiments, an additional entity, such as a third-party service provider, may operate the NFT engine 103 as a service provided to merchant systems 102 and/or issuer systems.

In non-limiting embodiments, the NFT data 110 may include digital media files (e.g., media objects and/or modified media objects), such as images, videos, and/or audio, associated with one or more merchants. In non-limiting embodiments, the NFT engine 103 mints each media object and/or modified media object on the blockchain network 112 as one or more NFTs. As used herein, the term "NFT" refers to a digital media file, such as an image, video, and/or audio file, that has been tokenized and distributed on a blockchain network 112. Each NFT may be minted on the blockchain and associated with a blockchain address (e.g., digital wallet address) corresponding to the NFT engine 103 and/or merchant system 102 associated with the NFT. It will be appreciated that various other entities may maintain custody of the NFT(s), such as but not limited to issuer systems, payment gateways, transaction processing systems, third-party service providers, and/or the like. Custody and/or ownership of an NFT may be established by possessing a private key that corresponds to the blockchain address where the NFT is stored. In some examples, possession and/or ownership may be established through one or more smart contracts on the blockchain network that establish rights relating to an NFT regardless of the owner of the blockchain address where it is stored.

In non-limiting embodiments, the NFT engine 103 generates a media object having a first design. As used herein, "design" refers visual and/or audio characteristics of the media objects, such as the visual characteristics of an image, the audio and/or visual (and arrangement and/or sequence thereof) characteristics of a video clip, or the audio characteristics of an audio clip. One or more copies of each media object may be stored as assets within the NFT data 110 such that the assets can be individually distributed to users operating user devices 104, 106, 108 via the blockchain network 112. As used herein, the term "asset" refers to a digital media file, such as an image, video, and/or audio file (e.g., the media object or modified media object). The first design may correspond to an offer campaign associated with the media object, such that the first design reflects at least one characteristic associated with the offer campaign. For example, an offer campaign offered by a specific merchant may generate a media object identifying that specific merchant as the source of the offer campaign, such as using a mark, logo, image, or design associated with that specific merchant. For example, an offer campaign offered for a specific event may generate a media object identifying that specific event as the basis of the offer campaign, such as using a mark, logo, or other design associated with that specific event.

In non-limiting embodiments, the NFT engine 103 may modify the media object to generate the modified media object. The modified media object may have a second design different from the first design. Thus, the NFT engine 103 may modify the design of the of the media object to generate the modified media object. Modifying the design of the media object may include deleting aspects of the first design, adding aspects to the first design, editing aspects of the first design, and/or any combination of modifications to the first design. For example, aspects of the first design may include text, imagery, colors, sounds, animations, and/or the like. Those aspects may be removed, changed, and/or added to generate a modified media object.

The NFT engine 103 and/or another system or entity may assign properties to each asset such that the asset properties for a given asset identify a value of the asset. In non-limiting embodiments, each asset may have a different value. The properties may correspond to a discount value to be associated with the minted NFT, such that the NFT may be redeemed as a coupon during a payment transaction initiated by the user owning the NFT.

In non-limiting embodiments, each modified media object may be minted on the blockchain as an individual NFT and associated with a blockchain address (e.g., digital wallet address) corresponding to the NFT engine 103 and/or merchant system 102 associated with the corresponding NFT. Asset data 111 may be stored by the blockchain network 112 in association with the minted NFT during the lifetime of the NFT. It will be appreciated that various other entities may maintain custody of the asset NFTs, such as but not limited to issuer systems, payment gateways, transaction processing systems, third-party service providers, and/or the like.

In non-limiting embodiments, the NFTs may be transferred to users (e.g., such as users associated with user devices 104, 106, 108) in response to a user satisfying a trigger action. In some non-limiting embodiments, the transfer may be automatic in response to a trigger action. In some non-limiting embodiments, one or more smart contracts on the blockchain network 112 may specify the trigger actions and initiate and/or control the transfer of the NFTs. For example, one or more assets may be transferred to a user in response to the user making at least one eligible transaction. As used herein, the term "eligible transaction" may refer to a transaction having one or more predetermined properties. For example, an eligible transaction may include an electronic payment transaction satisfying a threshold value, a transaction for a certain item or service, a transaction that increases a transaction frequency to satisfy a threshold value, and/or the like. An eligible transaction may involve a user and a merchant (e.g., a merchant associated with the merchant system 102).

In non-limiting embodiments, a user may be transferred a specific NFT, such as a customized modified media object customized and minted into the NFT based on a user profile (data associated with the user, including historical transaction data), transaction data (e.g., data associated with a particular type of eligible transaction), and/or the like in response to an eligible transaction. For example, user profile data may include data about user preferences, the user's geographic location, the user's name, the user's gender, and the like. For example, the transaction data may comprise transaction date and/or time, transaction location, goods/services purchased, merchant category, and the like.

Such data may be input into a machine-learning model configured to generate a modified design based on the input data. For example, the data may be input into an artificial intelligence based painting engine. Non-limiting examples of such artificial intelligence based painting engines include DALL-E, Deep AI, and NightCafe, although it will be appreciated that other similar machine-learning models may be used which automatically generate images based on input data. The data may be input to the artificial intelligence based painting engine as natural language, which the engine may process to generate the modified design. The input data may be at least partially the basis on which the artificial intelligence based painting engine generates the customized modified design.

In some non-limiting embodiments, the NFTs may be transferred directly to the users (e.g., to blockchain addresses for each user). In some non-limiting embodiments, the asset NFTs may be transferred to the users via smart contracts such that the user does not have custody of the NFTs but can establish possession and/or ownership via the smart contract. For example, the NFT engine 103, merchant system 102, and/or other system or entity may maintain custody of the NFTs (e.g., the NFTs may be stored at a blockchain address associated with the NFT engine 103 or other system) and may issue smart contracts on the blockchain network 112 to lease the NFTs to the users. In non-limiting embodiments, a smart contract may be executed with a user's blockchain address to establish the user's possession of the asset under the terms of the contract. In some non-limiting embodiments, the smart contracts may specify a time period and/or expiration date for the NFT or an associated offer such that the lease is only valid for a limited amount of time. For example, the time period may be based on a particular offer campaign. In some non-limiting embodiments, after a time period expires, possession and/or custody of the NFT by the user may be automatically terminated and transferred to another entity, such as the merchant system 102 and/or the NFT engine 103, which may render the NFT available for distribution to other users. In some non-limiting embodiments, after a time period expires, the value of the NFT as a coupon may automatically expire (having a value of $0). This expiration of the NFT as a coupon may be effected by automatically changing the state of the coupon from a first state (active coupon state) to a second state (expired coupon state).

In non-limiting embodiments, a user may collect NFTs and hold the NFTs or smart contracts that lease the NFTs to the user in a digital wallet. A collection of NFTs may be used by a user in various ways. In some non-limiting embodiments, an NFT or a set of NFTs may be collected and used to obtain a reward (e.g., such as a discount, free item, and/or the like).

In non-limiting embodiments, a user may communicate a request (e.g., a redemption request) for the NFT to the NFT engine 103. The request may be generated by, for example, a user computing device 104, a digital wallet application, and/or any computing device in communication with the NFT engine 103. In response to receiving the request, the NFT engine 103 may validate the request by determining that the user has possession of the asset(s). For example, the request may be validated using a public key associated with the user to validate a digital signature or other cryptographic operation conducted with the user's private key to establish that the user has custody of the assets and/or has possession of the assets via smart contracts. It will be appreciated that various ways to validate the user's possession of the assets may be used by the NFT engine 103. In some examples, a digital wallet application used by the user may interact with the NFT engine 103 and/or blockchain network 112 to establish proof (e.g., by digitally signing data with a private key or the like). The NFT engine 103, in response to validating the request, may transfer the NFT to the user via the blockchain network 112.

In non-limiting embodiments, the NFT engine 103 may issue (e.g., mint and transfer) any number of assets relating to the NFT. For example, the assets may include numerous duplicate versions of the same asset where some assets (e.g., particular portions of an image or other media file) may be more common than others such that a first number of first assets may be minted and a second number of second assets may be minted, where the second number is less than the first number. In this manner, the second assets may be rarer than the first assets. The value of each asset may determine the scarcity of the assets and may dynamically change over time based on user engagement, demand, and/or the like.

Figure 2:
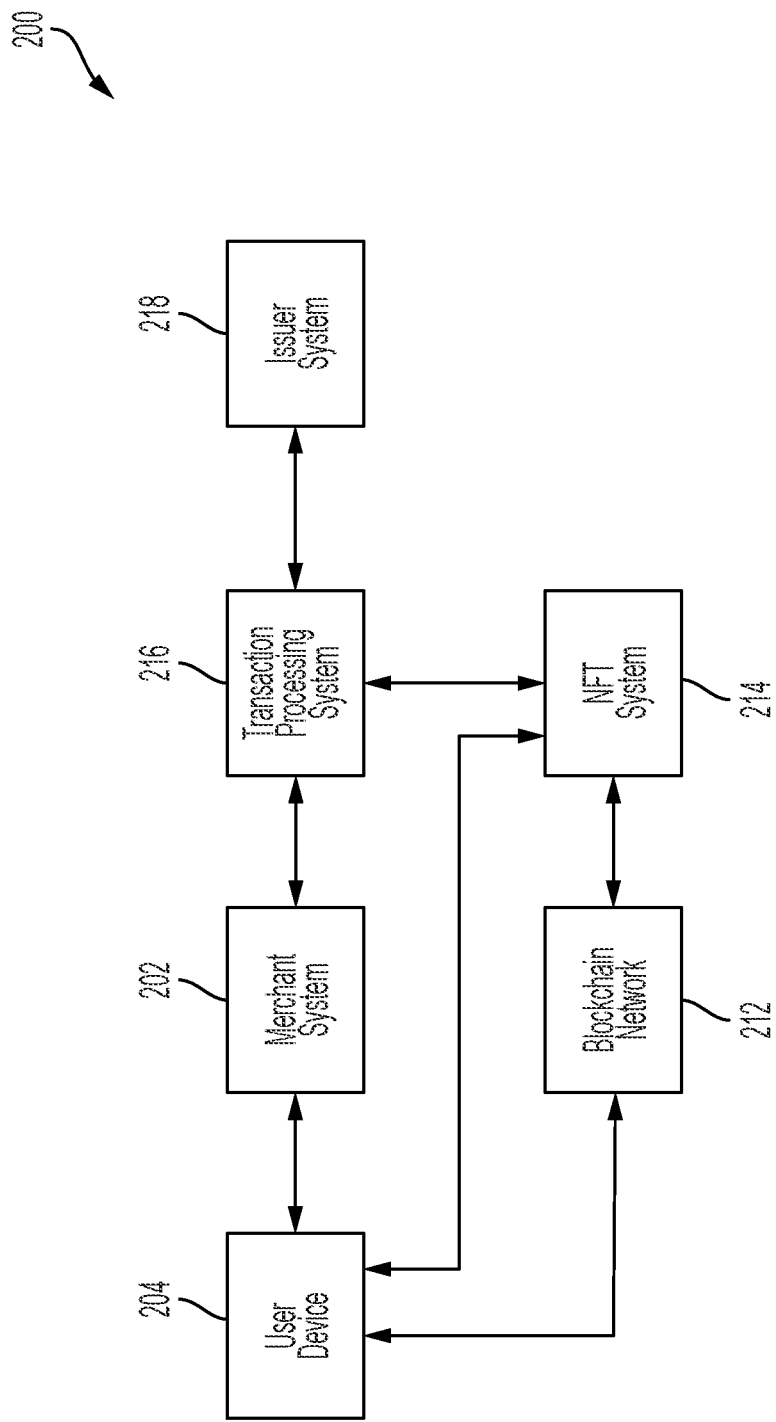
FIG. 2 shows a schematic diagram of a system for processing an NFT having a dynamic value, according to some non-limiting embodiments or aspects.

Referring to FIG. 2, a system 200 is shown for processing an NFT having a dynamic value, according to some non-limiting embodiments or aspects. Components from FIG. 2 having element numbers with the same final 2 digits as the components from FIG. 1 may have the same or similar characteristics except where explicitly described otherwise. Moreover, the NFT system 214 from FIG. 2 may embody the NFT engine 103 and the NFT data 110 from FIG. 1 and have the same or similar characteristics except where explicitly described otherwise. Moreover, the blockchain network 212 may include both the blockchain network 112 and asset data 111 from FIG. 1 and have the same or similar characteristics except where explicitly described otherwise.

The system 200 may further comprise a transaction processing system 216 in communication with the merchant system 202, issuer system 218, and the NFT system 214. The system 200 may further comprise the issuer system 218 in communication with the transaction processing system 216. The merchant system 202, transaction processing system 216, and the issuer system 218 may form an electronic payment processing network arranged to process (e.g., authorize, clear, and/or settle) electronic payment transactions between users and merchants.

With continued reference to FIG. 2, the NFT system 214 may generate a media object. The media object may be an image, a video clip, an audio clip, or some combination thereof.

The generated media object may be associated with an offer campaign. The generated media object may be associated with a trigger action. In some non-limiting embodiments, one or more smart contracts on the blockchain network 212 may specify the trigger actions and initiate and/or control the transfer of the NFTs. The trigger action may be an activity completed by the user which, upon occurrence thereof, earns the user an NFT derived from the media object. The trigger action is not particularly limited. For example, the trigger action may be an eligible transaction (e.g., a purchase activity) as previously described herein. For example, an eligible transaction may include an electronic payment transaction satisfying a threshold value, a transaction for a certain item or service, a transaction that increases a transaction frequency to satisfy a threshold value, and/or the like. The trigger action may be the user completing a survey or questionnaire or sharing a survey or questionnaire with at least one other user. The trigger action may be the user completing a volunteer (not for other monetary reward) task.

In some non-limiting embodiments or aspects, the merchant system 202, the transaction processing system 216, the issuer system 218, and/or the NFT system 214 may determine the specifications of the trigger action to be associated with the media object, such that the system 200 can recognize when the trigger action has been completed to trigger the modification of the media object and/or the issuance of the NFT derived therefrom. The association of the media object with the trigger action may be stored in at least one database, such as at least one database of the above systems.

With continued reference to FIG. 2, the electronic payment processing network (the merchant system 202, transaction processing system 216, and issuer system 218) may process electronic payment transactions associated with the user. A component of the electronic payment processing network and/or the NFT system 214 may monitor user activity (payment transaction activity or other activity) of the user to detect an occurrence of the trigger action by the user. For example, in the non-limiting example of the trigger action being a specific eligible electronic payment transaction, the electronic payment processing network and/or the NFT system 214 may monitor payment transactions of the user and identify that a particular payment transactions constitutes an occurrence of the trigger action.

In response to detection of the occurrence of the trigger action by the user, the NFT system 214 may modify the media object associated with the trigger action to generate a modified media object. The modified media object may have a design different from the design of the media object. Thus, the NFT system 214 may modify the design of the of the media object to generate the modified media object. Modifying the design of the media object may include deleting aspects of the first design, adding aspects to the first design, editing aspects of the first design, and/or any combination of modifications to the first design.

The modification to the media object may be based on trigger action data associated with the trigger action. The trigger action data may include any data further describing details of the trigger action, such as type of action, time of action, performer of the action, and the like. For example, the trigger action data may comprise transaction data associated with at least one payment transaction initiated by the user. The modification being "based on" the trigger action data refers to at least a portion of the design of the modified media object reflecting a characteristic of the trigger action, as defined by the trigger action data. For example, for the media object being an image, the modified design may include details about the time at which the action occurred, details about the user who performed the action, or details about the action, such as the specifics of the action that triggered the modification. Analogous modifications may be made to media objects in the form of video clips and/or audio clips.

To determine the type of modification to make to the media object, the NFT system 214 may collect trigger action data corresponding to details associated with the occurrence of the trigger action in response to detection of the occurrence of the trigger action by the user. From the collected trigger action data, the NFT system 214 may, using artificial intelligence, determine the modification to be made to generate the modified media object.

Figure 4:
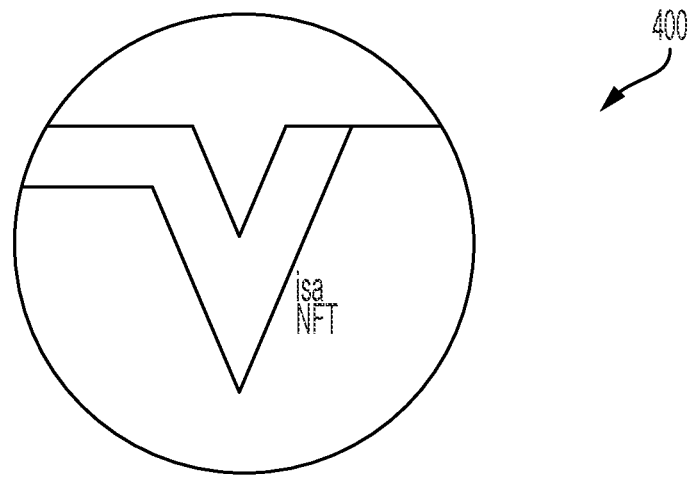
FIG. 4 shows a schematic diagram of a media object, according to some non-limiting embodiments or aspects.
Figure 5A:
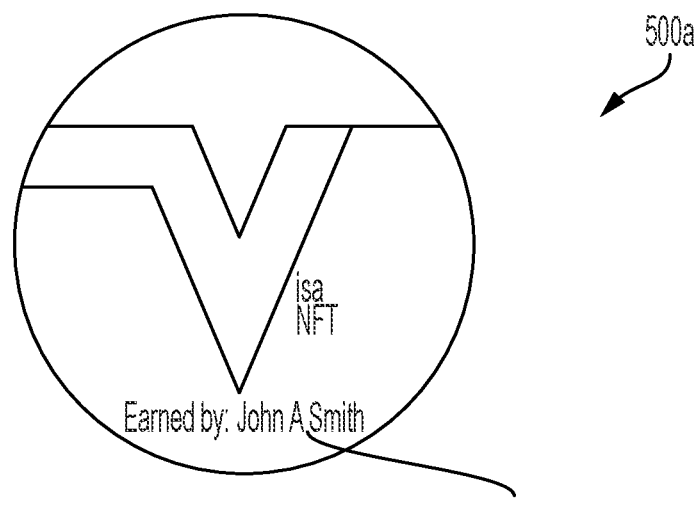
FIGS. 5A-5C show schematic diagrams of modified media objects, modifying the media object of FIG. 4, according to some non-limiting embodiments or aspects.
Figure 5B:
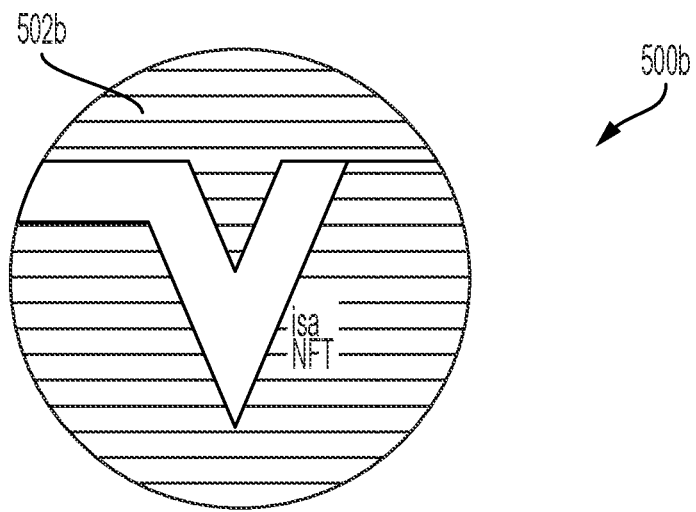
Figure 5C:
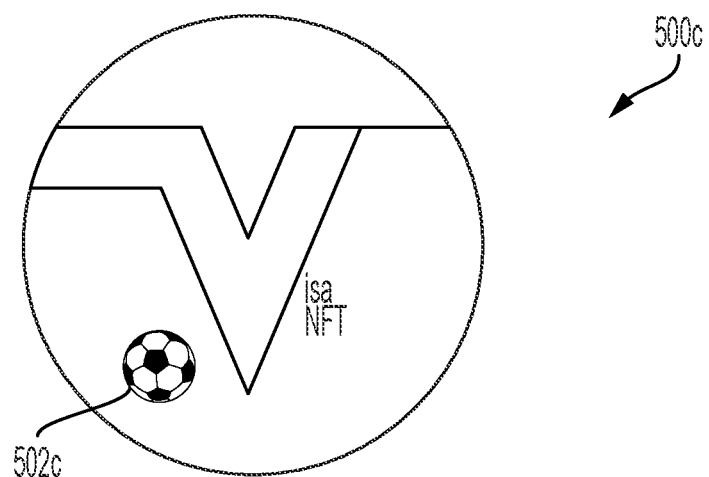

Referring to FIGS. 4-5C, a non-limiting example of a media object (FIG. 4) and modified media objects (FIGS. 5A-5C) are shown in which the media object and modification thereof is an image.

In FIG. 4, an image media object 400 is shown which may have been generated by the NFT system 214 prior to occurrence of the trigger action. The media object 400 may have any visual design (or audio content and/or visual design for audio and/or visual clips), as specified by the NFT system 214 and/or a component of the electronic payment processing network.

Referring to FIG. 5A, a modified media object 500a modifies the media object 400 from FIG. 4. In this non-limiting example, the modified media object 500a may include a user identifier 502a identifying the user who performed the trigger action. The user identifier 502a is a visual aspect added to the media object 400 from FIG. 4. The user identifier 502a may be an alphanumeric identifier, the user's name, and/or the like.

Referring to FIG. 5B, a modified media object 500b modifies the media object 400 from FIG. 4. In this non-limiting example, the modified media object 500b may include aspects such as a color design or pattern 502b, such as the blue design shown therein. The color(s) and/or pattern added to form the modified media object may reflect a user preference, an indicator of the type of action performed and/or the time it was performed, or a status level achieved by the user (e.g., bronze, silver, gold, platinum, etc.).

Referring to FIG. 5C, a modified media object 500c modifies the media object 400 from FIG. 4. In this non-limiting example, the modified media object 500c may include an aspect including a new design element 502c. The new design element may reflect a user preference, data about the type of action performed (e.g., purchase of a soccer ball), the type of marketing campaign with which the offer is associated, and the like.

Although FIGS. 5A-5C show examples of modified media objects 500a-c modifying the media object 400 form FIG. 4, it will be appreciated that any other types of design modifications may be made to a media object to form a modified media object, whether the media object is an image, video clip, audio clip, or some combination thereof.

Referring again to FIG. 2, the NFT system 214 may mint the modified media object as an NFT on the blockchain network 212 as described in connection with FIG. 1. The blockchain network 212 may maintain a secure and decentralized record of transactions associated with the minted NFT.

A dynamic value may be associated with the NFT. As used herein, the "dynamic value" of the NFT refers to its redeemable value changing as a function of at least time. This may include the NFT having a first value at a first time and a second higher or lower value at a second time. This also includes embodiments in which the NFT value changes based on the number of NFTs in an offer campaign that have been issued and/or redeemed already. For example, in an offer campaign, a first NFT being redeemed may have a first value, while a second NFT being redeemed at a later time may have a higher or lower value than the first value due to the first NFT having already been redeemed. Such embodiment is also changing as a function of at least time, as the first and second NFT were redeemed at different times such that the value of the NFT changed over time. The dynamic value of the NFT may range from 1-20%, such as 5-20%, of the transaction amount of the transaction during which the NFT was redeemed.

The dynamic value of the NFT may be configured to change according to an algorithm. This algorithm may be configured to process variables to generate an output of a dynamic value associated with the NFT at a particular time. This algorithm may be stored on the blockchain network 212 associated with the NFT, as an example, such as part of a smart contract, as part of a service and/or application offered on the blockchain network 212, as part of the NFT itself (e.g., a dynamic value encoded in the media file that changes based on a current data), and/or the like. In some non-limiting embodiments, the algorithm may be executed by any computing device (e.g., a component of the blockchain network 212, the NFT system 214, the merchant system 202, the transaction processing system 216, the issuer system 218, and/or the like) and may be on or off the blockchain. The user may be notified of the algorithm such that the user may independently verify the dynamic value determined by the NFT system 214, enabling enhanced transparency of the system. To verify the dynamic value of the NFT at a given time, a user may query the NFT system 214 (e.g., via an application programming interface (API)) by inputting metadata associated with the NFT to receive a return message that provides the current value of the NFT.

Any suitable algorithm may be associated with the NFT to determine its dynamic value. The algorithm may use, as inputs, any number of parameters. For example, the algorithm may be such that the dynamic value of the NFT decreases over time. For example, the algorithm may be such that the dynamic value of the NFT increases over time. The value of the NFT may change discretely or continually over time. By changing discretely over time, the change in dynamic value periodically changes and has a constant value in between the periods of change. By changing continually over time, the change in dynamic value is continually changing without periods of constant value. Combinations of discrete and continual change may also be used to define the change in the NFT's dynamic value over time.

With continued reference to FIG. 2, the NFT system 214 and/or the blockchain network 212 may provide the minted NFT having the dynamic value to the user by transferring the NFT on the blockchain network to a blockchain address associated with the user or user device 204. The user device 204 may access the NFT through one or more applications that enable communication with the blockchain network 212, such as in a digital wallet configured to store NFTs.

Figure 6:
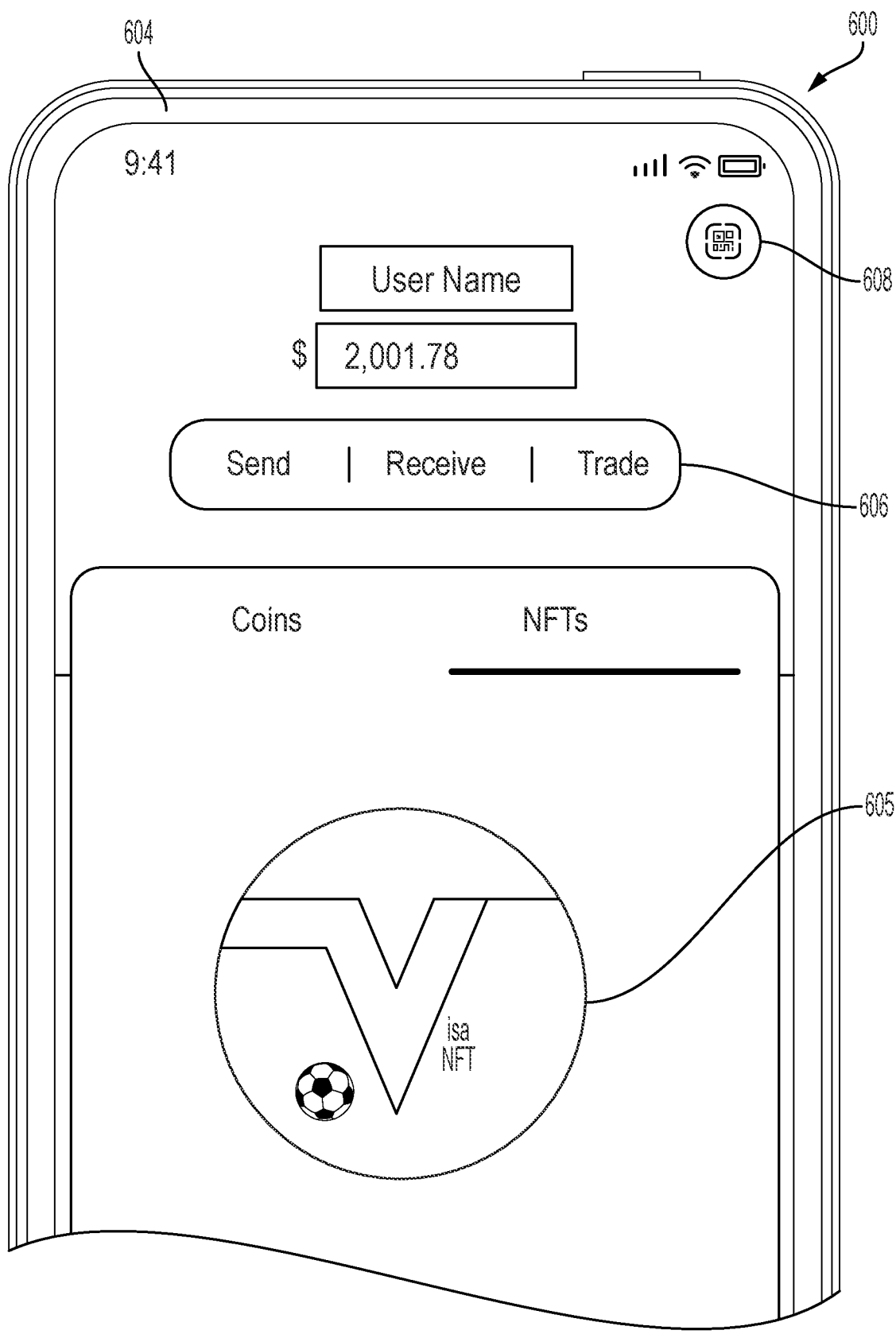
FIG. 6 shows a schematic diagram of a digital wallet storing an NFT, according to some non-limiting embodiments or aspects.

Referring to FIG. 6, a digital wallet 600 is shown for storing NFTs, according to some non-limiting embodiments or aspects. The digital wallet 600 may comprise a digital wallet application stored on a user device 604. The digital wallet 600 may store NFTs 605 thereon, which may be perceivable by the user of the user device 604 (e.g., by being displayed thereon). As used herein, the digital wallet 600 storing NFTs 605 thereon may refer to the digital wallet 600 maintaining at least one key (public and/or private) to the NFT address, such that the NFT itself may be maintained on the blockchain. The digital wallet 600 may include a pointer to the NFT address or a representation of the NFT 605. The digital wallet 600 may further comprise transfer controls 606 that enable a user to, for example, buy new NFTs, sell NFTs stored in the digital wallet 600, send or receive NFTs, trade NFTs, redeem NFTs, and the like. Selection of a transfer control 606 may initiate a transfer action of an NFT to and/or from the digital wallet 600. The digital wallet 600 may further comprise a scanner command 608 which may cause the user device 604 to scan a machine readable code (e.g., exposing a blockchain address or cryptographic challenge) to cause the digital wallet 600 to effect a command associated with the NFT, such as a transfer or redemption thereof. Additionally or alternatively, the scanner command 608 may cause the user device 604 to generate and/or display a machine readable code to display on the user device (e.g., exposing a blockchain address), which may be scanned by a separate scanner device (e.g., of the merchant system) to effect a command associated with the NFT, such as a transfer or redemption thereof. It will be appreciated that the digital wallet shown in FIG. 6 is non-limiting, and the digital wallet may include additional or fewer features and may have any suitable graphical user interface (GUI). It will be appreciated that the NFT may be transferred between users, such that the possessing user may initiate redemption of the NFT. During transfer of the NFT from the possessing user to the receiving user, the coupon value and/or the state of the NFT may be displayed for the possessing user and/or the receiving user.

Referring again to FIG. 2, in response to the user initiating redemption of the NFT in connection with an electronic payment transaction having a transaction amount, the system 200 may determine a dynamic value of the NFT. The electronic payment transaction may have been initiated between the user and the merchant, such as by the user device 204 and/or payment device of the user initiating an electronic payment transaction with the merchant system 202. The electronic payment transaction may be processed by the electronic payment processing network, which may include authorization, clearing, and settling of the payment transaction. During processing of the electronic payment transaction, the NFT may be redeemed. Alternatively, after processing of the electronic payment transaction, the NFT may be redeemed.

The dynamic value may be determined by any component of the system 200, such as the merchant system 202, the transaction processing system 216, the issuer system 218, the blockchain network 212, and/or the NFT system 214. The dynamic value of the NFT may be determined for the NFT based on the algorithm, such as by inputting the variables associated with the initiation of the redemption of the NFT, such as the time at which redemption is initiated or other transaction data associated with the electronic payment transaction, into the algorithm to generate the dynamic value of the NFT at the time of redemption initiation.

Figure 3A:
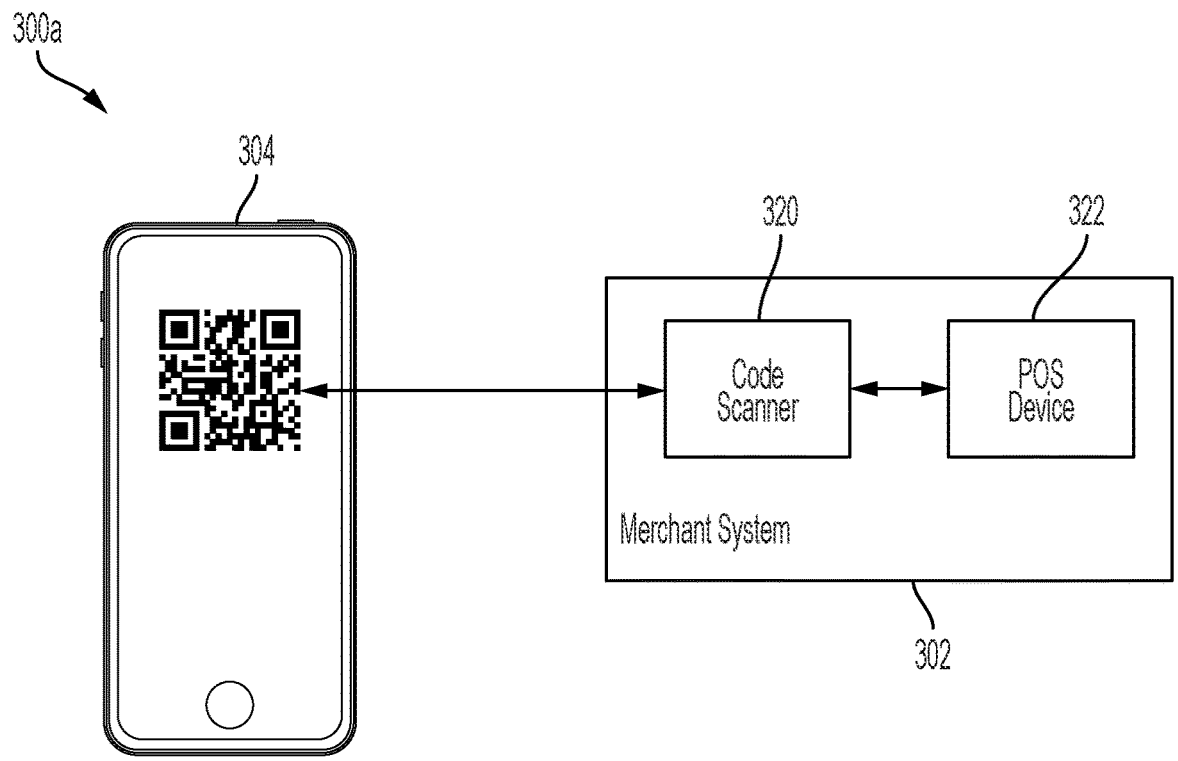
FIG. 3A shows a schematic diagram of a system for processing an NFT having a dynamic value, according to some non-limiting embodiments or aspects.
Figure 3B:
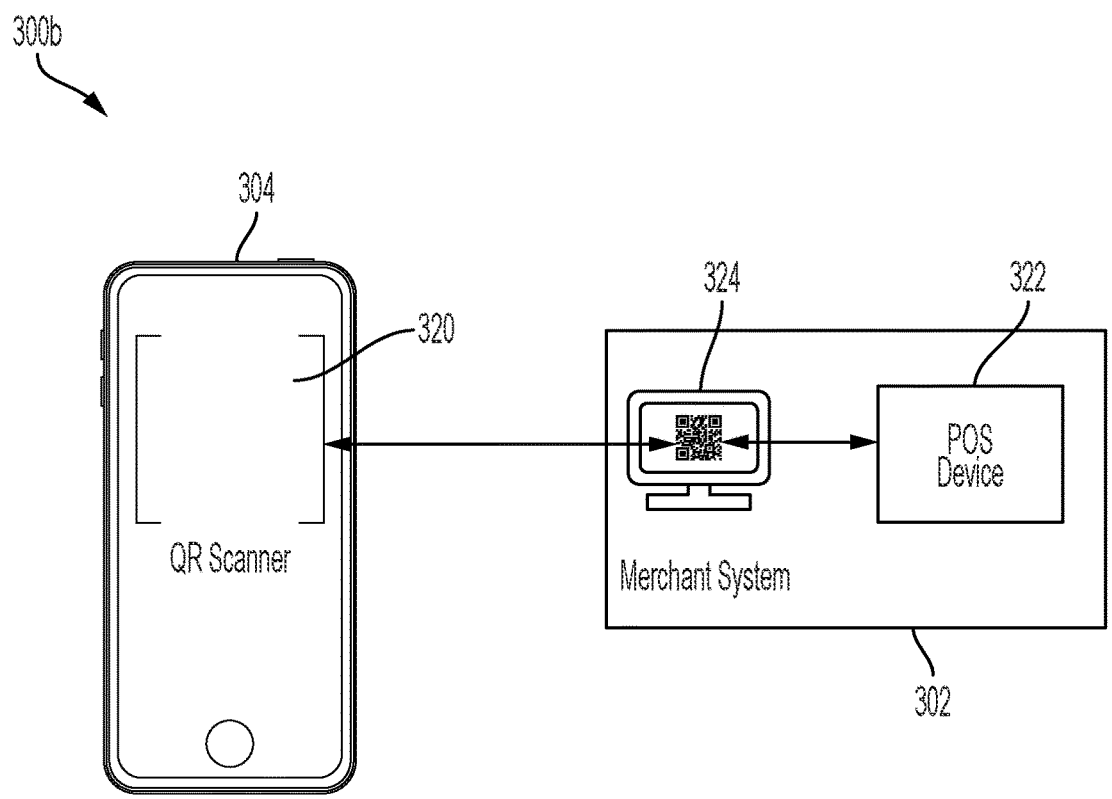
FIG. 3B shows a schematic diagram of a system for processing an NFT having a dynamic value, according to some non-limiting embodiments or aspects.

Referring to FIGS. 3A and 3B, systems 300a, 300b are shown for processing an NFT having a dynamic value according to some non-limiting embodiments or aspects. In particular, these systems 300a, 300b show the components that may be used to initiate redemption of an NFT, such as an NFT stored in a digital wallet.

In the non-limiting example of FIG. 3A, a user device 304 may communicate with a merchant system 302 to initiate redemption of an NFT stored on the user device 304. The merchant system 302 may have the same or similar characteristics compared to the merchant system 102, 202 from FIGS. 1 and 2 except where described otherwise. The merchant system 302 may comprise a POS device 322 for engaging with a payment device of the user to initiate a payment transaction. The user may be prompted by the merchant system 302 to input a blockchain address to initiate redemption of the NFT as a coupon. Through the blockchain, a user may view the current dynamic value of an NFT, verify ownership of an NFT, and/or the like. The merchant system 302 may comprise a code scanner 320 configured to scan a machine readable code corresponding to the NFT (e.g., including a blockchain address, digital signature, and/or cryptographic challenge encoded therein) to initiate redemption of the NFT as a coupon. The machine readable code may be scanned during processing of the payment transaction between the user and the merchant. Any suitable type of machine readable code may be used, such as a QR code, a bar code, or the like. Initiating redemption of the NFT may comprise the user device 304 generating and displaying a machine readable code corresponding to the NFT and the code scanner 320 of the merchant system 302 scanning the machine readable code displayed by the user device 304. Based on the scanned machine readable code, the merchant system 302 (or another component of the systems 100, 200 from FIGS. 1-2) may identify the NFT, which may be linked to a coupon code associated with a discount offer. From the identification of the NFT, the dynamic value of the NFT may automatically be determined as described herein.

In the non-limiting example of FIG. 3B, the system 300b is similar to the system 300a from FIG. 3A except as follows. The merchant system 302 still includes the POS device 322 but additionally includes a merchant computer 324. The merchant computer 324 may have a display for generating and displaying a machine readable code (e.g., including a blockchain address and/or cryptographic challenge encoded therein) to be scanned by the user device 304. The user device 304 may comprise the code scanner 320 to enable the user device 304 to scan the machine readable code displayed on the merchant computer 324. The machine readable code may be scanned during processing of the payment transaction between the user and the merchant. Initiating redemption of the NFT may comprise the merchant computer 324 generating and displaying a machine readable code corresponding to the merchant system and the code scanner 320 of the user device 304 scanning the machine readable code displayed by the merchant computer 324. Based on the machine readable code, the user device 304 may generate a message comprising data associated with the NFT and transmit the message to the merchant system 302 (based on the machine readable code) to enable the redemption of the NFT toward the payment transaction. Based on the message, the merchant system 302 (or another component of the systems 100, 200 from FIGS. 1-2) may identify the NFT, which may be linked to a coupon code associated with a discount offer. From the identification of the NFT, the dynamic value of the NFT may automatically be determined as described herein. By the user device 304 scanning a machine readable code of the merchant and transmitting a message to the merchant system 302 with the data needed to process the NFT for the payment transaction, the user exposing their private key may be avoided.

Referring again to FIG. 2, in response to determining the dynamic value of the NFT, the electronic payment transaction may be processed by applying the dynamic value of the NFT to the transaction amount to generate an updated transaction amount. The updated transaction amount may correspond to the difference between the transaction amount and the dynamic value of the NFT. Thus, application of the dynamic value of the NFT to the transaction amount may reduce the transaction amount due by the user. The electronic payment processing network may apply the dynamic value to the transaction amount. The dynamic value may be applied to the transaction amount during processing of the payment transaction. For example, the transaction amount may be changed to the updated transaction amount before at least one of authorization, clearing, and settling is completed. Therefore, the NFT may be redeemed in an offer campaign as a coupon for a discount.

In some non-limiting embodiments or aspects, the coupon code linked to the NFT and a timestamp may be encrypted based on a rule which automatically activates the NFT for use as a coupon for a predetermined amount of time before it is automatically deactivated. If the NFT is not used as a coupon within the predetermined amount of time, it may not be used as a coupon due to time-out of the coupon code. For example the predetermined amount of time may be less than 1 hour, such as less than 5 minutes. This prevents multiple uses of the same NFT as a coupon.

According to some non-limiting embodiments or aspects, in response to applying the dynamic value of the NFT to the transaction amount, the NFT system 214 (or another component of the system 200) may retrieve the NFT from the user. For example, the NFT system 214 may cause the NFT to be transferred from the user's address to an address of the NFT system 214 after redemption of the NFT. The transfer of the NFT from the user's address to and address of the NFT system 214 may prevent the NFT from being redeemed multiple times by the user. Further, the NFT system 214 may put the NFT back into circulation to a second user based on the second user performing a trigger action warranting the earning of the NFT. Thus, the NFT may be re-usable. The NFT system 214 (or another component of the system 200) may control the number of circulating NFTs by maintaining a number or percentage of NFTs associated with an offer campaign and held by the NFT system 214 while issuing to users the balance of the NFTs associated with an offer campaign to control the amount of NFTs held by users and redeemable as coupons.

According to some non-limiting embodiments or aspects, in response to applying the dynamic value of the NFT to the transaction amount, the NFT may automatically be deactivated from being used as a coupon (as described above) in a future electronic payment transaction. For example, the NFT system 214 (or another component of the system 200) may communicate a deactivation message to the user device 204 to cause the NFT to be deactivated. For example, an indication may be published on the blockchain marking the NFT as deactivated. The deactivation message may prevent the NFT from being redeemed multiple times by the user while still enabling the user to keep the NFT in the digital wallet. The deactivation of the NFT as a coupon may be effected by automatically changing the state of the coupon from a first state (active coupon state) to a second state (deactivated coupon state).

Figure 7:
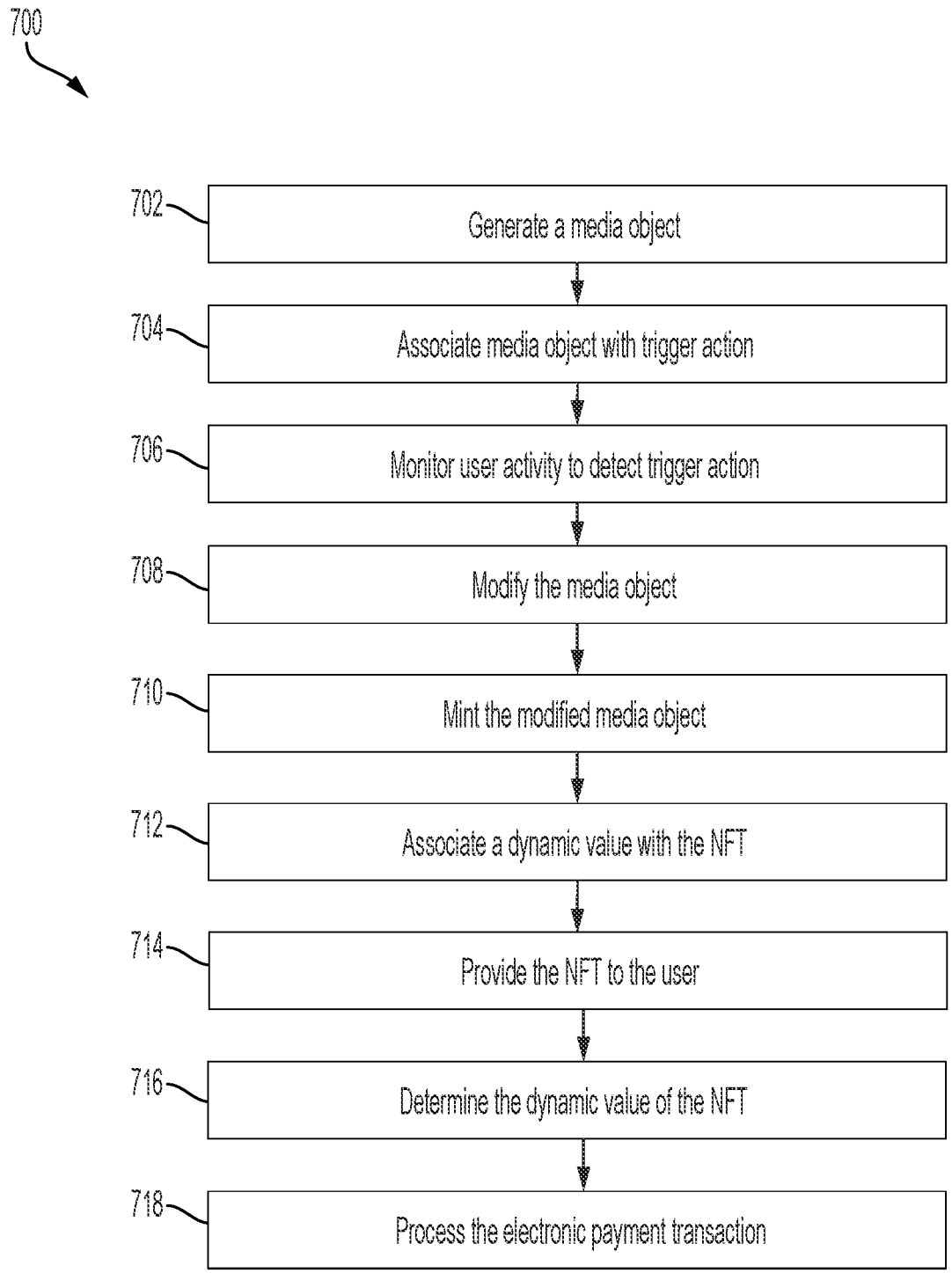
FIG. 7 shows a step diagram of a method for processing an NFT having a dynamic value, according to some non-limiting embodiments or aspects.

Referring to FIG. 7, a method 700 is shown for processing an NFT having a dynamic value according to some non-limiting embodiments or aspects. At a step 702, a media object may be generated. At a step 704, the media object may be associated with a trigger action. At a step 706, user activity of a user may be monitored to detect an occurrence of the trigger action by the user. At a step 708, in response to detection of the occurrence of the trigger action by the user, the media object may be modified to generate a modified media object.

At a step 710, the modified media object may be minted as a non-fungible token (NFT) on a blockchain network. At a step 712, a dynamic value may be associated with the NFT, where the dynamic value is configured to change as a function of at least time according to an algorithm. At a step 714, the NFT may be provided to the user. At a step 716, in response to the user initiating redemption of the NFT in connection with an electronic payment transaction having a transaction amount, a dynamic value of the NFT may be determined based on the algorithm. At a step 718, the electronic payment transaction may be processed by applying the dynamic value to the transaction amount.

Figure 8:
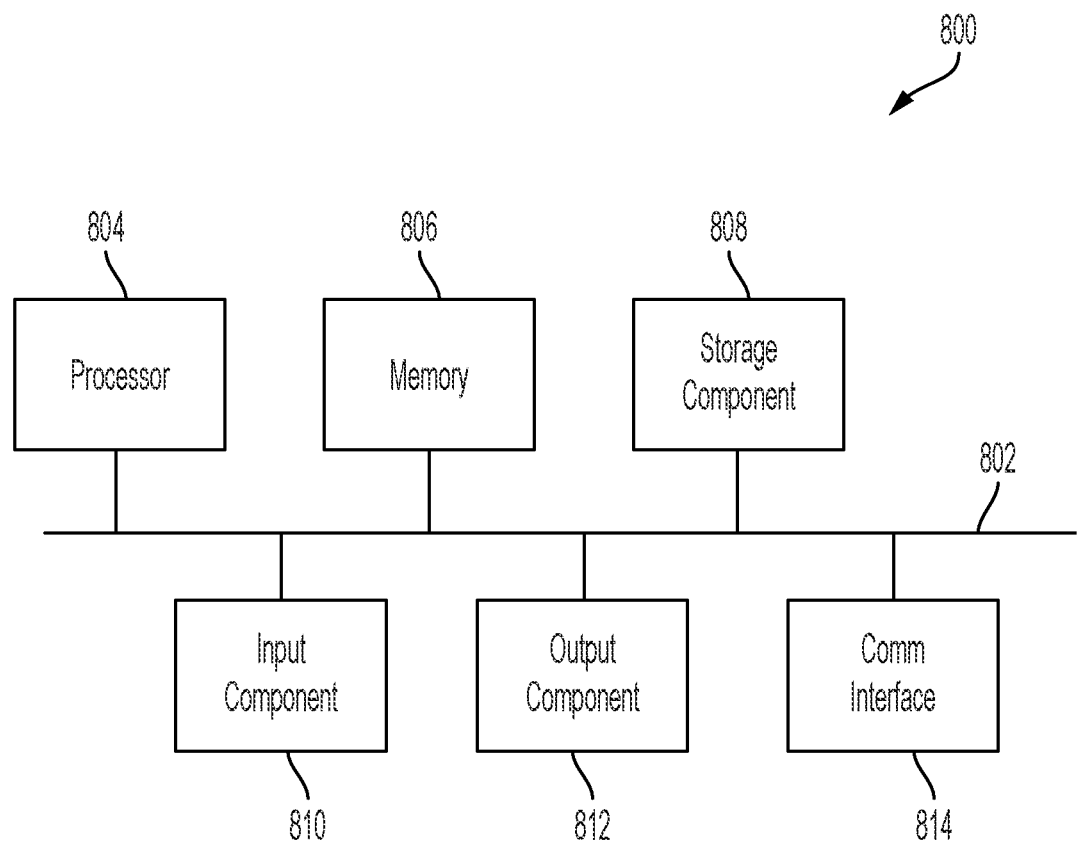
FIG. 8 shows a diagram of components of one or more devices, according to non-limiting embodiments or aspects.

Referring to FIG. 8, shown is a diagram of example components of a computing device 800 for implementing and performing the systems and methods described herein according to some non-limiting embodiments or aspects. In some non-limiting embodiments, device 800 may include additional components, fewer components, different components, or differently arranged components than those shown in FIG. 8. Device 800 may include a bus 802, a processor 804, memory 806, a storage component 808, an input component 810, an output component 812, and a communication interface 814. Bus 802 may include a component that permits communication among the components of device 800. In some non-limiting embodiments, processor 804 may be implemented in hardware, firmware, or a combination of hardware and software. For example, processor 804 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), virtual or augmented reality depicting systems and devices, etc.) that can be programmed to perform a function. Memory 806 may include random access memory (RAM), read only memory (ROM), and/or another type of dynamic or static storage device (e.g., flash memory, magnetic memory, optical memory, etc.) that stores information and/or instructions for use by processor 804.

With continued reference to FIG. 8, storage component 808 may store information and/or software related to the operation and use of device 800. For example, storage component 808 may include a hard disk (e.g., a magnetic disk, an optical disk, a magneto-optic disk, a solid-state disk, etc.) and/or another type of computer-readable medium. Input component 810 may include a component that permits device 800 to receive information, such as via user input (e.g., a touch screen display, a keyboard, a keypad, a mouse, a button, a switch, a microphone, etc.). Additionally, or alternatively, input component 810 may include a sensor for sensing information (e.g., a global positioning system (GPS) component, an accelerometer, a gyroscope, an actuator, etc.). Output component 812 may include a component that provides output information from device 800 (e.g., a display, a speaker, one or more light-emitting diodes (LEDs), etc.). Communication interface 814 may include a transceiver-like component (e.g., a transceiver, a separate receiver and transmitter, etc.) that enables device 800 to communicate with other devices, such as via a wired connection, a wireless connection, or a combination of wired and wireless connections. Communication interface 814 may permit device 800 to receive information from another device and/or provide information to another device. For example, communication interface 814 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 800 may perform one or more processes described herein. Device 800 may perform these processes based on processor 804 executing software instructions stored by a computer-readable medium, such as memory 806 and/or storage component 808. A computer-readable medium may include any non-transitory memory device. A memory device includes memory space located inside of a single physical storage device or memory space spread across multiple physical storage devices. Software instructions may be read into memory 806 and/or storage component 808 from another computer-readable medium or from another device via communication interface 814. When executed, software instructions stored in memory 806 and/or storage component 808 may cause processor 804 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

In some non-limiting embodiment or aspects, a computer program product for processing an NFT having a dynamic value includes at least one non-transitory computer readable medium including program instructions that, when executed by at least one processor, cause the at least one processor to execute one of the previously-described methods. The at least one processor may include any of the components shown in FIGS. 1-3B (e.g., the merchant system 102, 202, 302; NFT engine 103; user devices 104, 106, 108, 204, 304; NFT data 110; asset data 111; blockchain network 112, 212; NFT system 214; transaction processing system 216; issuer system 218; code scanner 320; POS device 322; merchant device 324; and the like).

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment, and one or more steps may be taken in a different order than presented in the present disclosure.

What is claimed is:

1. A method comprising:
   generating, with at least one processor, a media object comprising a first design comprising a first visual and/or first audio characteristic when displayed and/or emitted by a user device of a user;
   associating, with at least one processor, the media object with a trigger action;
   distributing, with at least one processor, the media object to the user device, the media object displayed and/or emitted by the user device;
   monitoring, with at least one processor, user activity of the user and detecting an occurrence of the trigger action by the user;
   in response to detection of the occurrence of the trigger action by the user, modifying, with the at least one processor, the media object by generating a modified media object comprising a second design comprising a second visual and/or second audio characteristic when displayed and/or emitted by the user device, the second design being different from the first design;
   minting, with at least one processor, the modified media object as a non-fungible token (NFT) on a blockchain network;
   activating, with at least one processor, the NFT as a coupon by linking the NFT to a coupon code associated with a discount offer;
   associating, with at least one processor, a dynamic value with the NFT, the dynamic value configured to change as a function of at least time according to an algorithm;
   transferring, with at least one processor, the NFT to a digital wallet of the user, the modified media object displayed and/or emitted by the user device;
   receiving, with at least one processor, a request from the user device that initiates redemption of the NFT in connection with an electronic payment transaction having a transaction amount;
   in response to the user initiating redemption of the NFT in connection with the electronic payment transaction, identifying, with at least one processor, the NFT, and determining, with at least one processor, the dynamic value of the NFT based on the algorithm;
   processing, with at least one processor, the electronic payment transaction by applying the dynamic value to the transaction amount; and
   in response to applying the dynamic value to the transaction amount, automatically deactivating, with at least one processor, the NFT from being used as a coupon.

2. The method of claim 1, further comprising:
   scanning, with at least one processor, a machine readable code corresponding to the NFT displayed on the user device; and
   identifying, with at least one processor, the NFT based on the machine readable code.

3. The method of claim 2, wherein the machine readable code is scanned during processing of the electronic payment transaction.

4. The method of claim 2, wherein the machine readable code comprises a QR code.

5. The method of claim 1, further comprising:
   in response to detection of the occurrence of the trigger action by the user, collecting, with at least one processor, trigger action data corresponding to details associated with the occurrence of the trigger action,
   wherein the media object is modified based on the trigger action data.

6. The method of claim 5, wherein a design of the media object is modified from the first design to the second design based on the trigger action data.

7. The method of claim 1, wherein the trigger action comprises at least one purchase activity executed by the user.

8. The method of claim 1, wherein the dynamic value associated with the NFT decreases over time.

9. The method of claim 1, wherein in response to applying the dynamic value to the transaction amount, retrieving, with at least one processor, the NFT from the user by transferring the NFT from the digital wallet of the user.

10. A system comprising at least one processor programmed and/or configured to:
   generate a media object comprising a first design comprising a first visual and/or first audio characteristic when displayed and/or emitted by a user device of a user;
   associate the media object with a trigger action;
   distribute the media object to the user device, the media object displayed and/or emitted by the user device;
   monitor user activity of the user and detect-a user to detect an occurrence of the trigger action by the user;
   in response to detection of the occurrence of the trigger action by the user, modify the media object by generating a modified media object comprising a second design comprising a second visual and/or second audio characteristic when displayed and/or emitted by the user device, the second design being different from the first design;
   mint the modified media object as a non-fungible token (NFT) on a blockchain network;
   activate the NFT as a coupon by linking the NFT to a coupon code associated with a discount offer;
   associate a dynamic value with the NFT, the dynamic value configured to change as a function of at least time according to an algorithm;
   transfer the NFT to a digital wallet of the user, the modified media object displayed and/or emitted by the user device;
   receive a request from the user device that initiates redemption of the NFT in connection with an electronic payment transaction having a transaction amount;
   in response to the user initiating redemption of the NFT in connection with the electronic payment transaction, identify the NFT and determine the dynamic value of the NFT based on the algorithm;
   process the electronic payment transaction by applying the dynamic value to the transaction amount; and
   in response to applying the dynamic value to the transaction amount, automatically deactivate the NFT from being used as a coupon.

11. The system of claim 10, wherein initiating redemption of the NFT comprises scanning a machine readable code corresponding to the NFT displayed on the user device, wherein the at least one processor is programmed and/or configured to identify the NFT based on the machine readable code.

12. The system of claim 11, wherein the machine readable code is scanned during processing of the electronic payment transaction.

13. The system of claim 11, wherein the machine readable code comprises a QR code.

14. The system of claim 10, wherein the at least one processor is programmed and/or configured to:
   in response to detection of the occurrence of the trigger action by the user, collect trigger action data corresponding to details associated with the occurrence of the trigger action,
   wherein the media object is modified based on the trigger action data.

15. The system of claim 14, wherein a design of the media object is modified from the first design to the second design based on the trigger action data.

16. The system of claim 10, wherein the trigger action comprises at least one purchase activity executed by the user.

17. The system of claim 10, wherein the dynamic value associated with the NFT decreases over time.

18. The system of claim 10, wherein in response to applying the dynamic value to the transaction amount, the at least one processor is programmed and/or configured to deactivate the NFT from being used as a coupon in a future electronic payment transaction by transferring the NFT from the digital wallet of the user.

19. A computer program product comprising at least one non-transitory computer-readable medium including program instructions that, when executed by at least one processor, cause the at least one processor to:
   generate a media object comprising a first design comprising a first visual and/or first audio characteristic when displayed and/or emitted by a user device of a user;
   associate the media object with a trigger action;
   distribute the media object to the user device, the media object displayed and/or emitted by the user device;
   monitor user activity of the user and detect an occurrence of the trigger action by the user;
   in response to detection of the occurrence of the trigger action by the user, modify the media object by generating a modified media object comprising a second design comprising a second visual and/or second audio characteristic when displayed and/or emitted by the user device, the second design being different from the first design;
   mint the modified media object as a non-fungible token (NFT) on a blockchain network;
   activate the NFT as a coupon by linking the NFT to a coupon code associated with a discount offer;
   associate a dynamic value with the NFT, the dynamic value configured to change as a function of at least time according to an algorithm;
   transfer the NFT to a digital wallet of the user, the modified media object displayed and/or emitted by the user device;
   receive a request from the user device that initiates redemption of the NFT in connection with an electronic payment transaction having a transaction amount;
   in response to the user initiating redemption of the NFT in connection with the electronic payment transaction, identify the NFT and determine the dynamic value of the NFT based on the algorithm;
   process the electronic payment transaction by applying the dynamic value to the transaction amount; and
   in response to applying the dynamic value to the transaction amount, automatically deactivate the NFT from being used as a coupon.

* * * * *

UNITED STATES PATENT AND TRADEMARK OFFICE
CERTIFICATE OF CORRECTION

| | | |
|---|---|---|
| PATENT NO. | : 12,254,470 B2 | Page 1 of 1 |
| APPLICATION NO. | : 17/974935 | |
| DATED | : March 18, 2025 | |
| INVENTOR(S) | : Gabriel Teo Yu Xiang et al. | |

It is certified that error appears in the above-identified patent and that said Letters Patent is hereby corrected as shown below:

In the Claims

Column 23, Line 20, Claim 10, delete "detect-a user to detect" and insert -- detect --

Signed and Sealed this
Sixth Day of May, 2025

Coke Morgan Stewart
*Acting Director of the United States Patent and Trademark Office*